United States Patent [19]

Straubel

[11] 3,739,357

[45] June 12, 1973

[54] MAGNETIC SHIFT MEMORY

[75] Inventor: Reinhard Straubel, Berlin, Germany

[73] Assignee: VEB Filmfabrik Wolfen Fotochemisches Kombinat, Wolfen, Germany

[22] Filed: Dec. 4, 1970

[21] Appl. No.: 95,224

[52] U.S. Cl. 340/174 MC, 340/174 PM, 340/174 SR

[51] Int. Cl. .......... G11c 19/00, G11c 11/14

[58] Field of Search .......... 340/174 MC, 174 PM

[56] References Cited

UNITED STATES PATENTS

| | | | |
|---|---|---|---|
| 3,483,534 | 12/1969 | Castellani et al | 340/174 BC |
| 3,456,248 | 7/1969 | Daughton et al | 340/174 BC |
| 3,295,114 | 12/1966 | Snyder | 340/174 MC |
| 3,140,471 | 7/1964 | Fuller | 340/174 MC |
| 3,148,360 | 9/1964 | Hale | 340/174 MC |
| 3,438,016 | 4/1969 | Spain | 340/174 MC |
| 3,540,020 | 11/1970 | Schwartz | 340/174 M C |
| 3,553,661 | 1/1971 | Hadden, Jr. | 340/174 MC |

*Primary Examiner*—Stanley M. Urynowicz, Jr.
*Attorney*—Nolte and Nolte

[57] ABSTRACT

This invention relates to a magnetic shift memory for example in the form of a long ribbon, preferably endless, wherein the required raster of varying magnetic fields is provided in a permanent magnetic layer arranged adjacent to strips of magnetic material and sufficiently close thereto for causing on application of an impulse shaped current, a raster-like periodic variation of the critical switching field strength. The periodicity of the raster-like magnetization need not be constant. It may extend longitudinally and/or traversely and/or at an angle relative to the permanent magnetic layer.

7 Claims, 2 Drawing Figures

Figure 1:
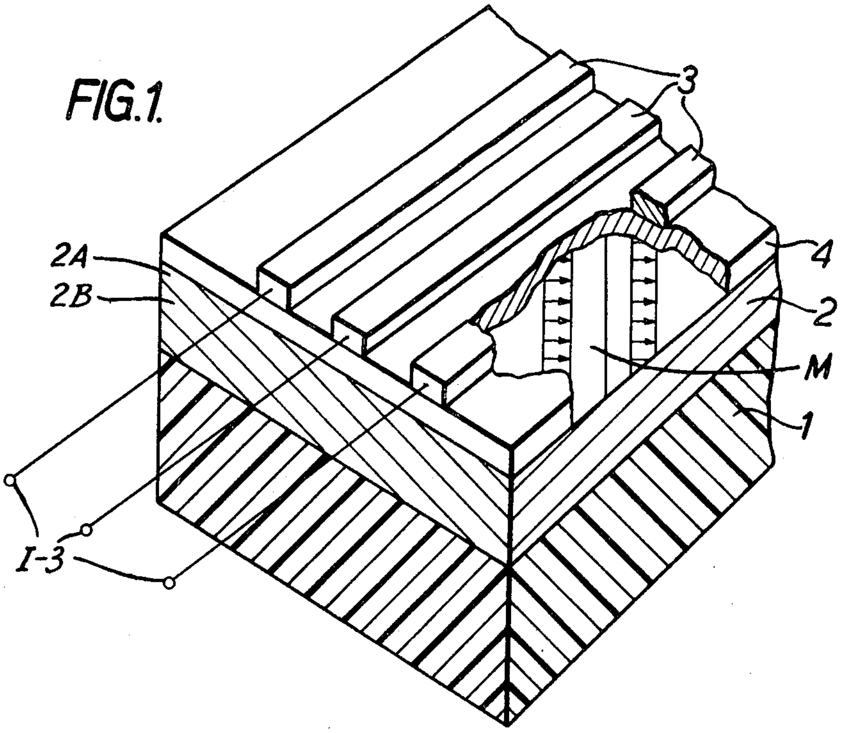

REINHARD STRAUBEL
INVENTOR

BY Nolte & Nolte
ATTORNEY

MAGNETIC SHIFT MEMORY

The present invention relates to magnetic shift memories, more specifically, to such memories wherein informations stored in the form of magnetically distinct areas or structures are shiftable without erasure or destruction of the information content.

Such memories are known in the art and have been described for example in German Patent Publication (DAS) 1,264,508 and in the following literature: K. D. Broadbent, A Thin Magnetic Film Shift Register IRE Transactions on Electronic Computers No. 9 (1960) Pages 321 – 323; R. J. Spain, H. J. Jauvtis, Controlled Domain Tip Propagation Part I and II, Journal of Applied Physics 37 (June 1966) No. 7, Pages 2572 – 2593.

Known devices and systems are capable of an information shift without erasure. These devices and systems are based on the fact that the information contents are prevented by means of a raster from erasing each other when an impulse field is applied for effecting the shift in one direction. These information contents are stored in strips of magnetic material in the form of magnetized areas. Generally, these areas are magnetized in an anti-parallel fashion.

It is also known to produce the required raster by arranging respective coils or windings above and/or under the strip of magnetic material in such a manner that the impulse currents required for the information shift flow directly through these windings in the proper phase relationship.

Further, as described in U.S. Pat. No. 3,366,937 and the article "Some New Thin-Film Shift Register Designs", Spain, Jauvtis and Fuller, Journal of Applied Physics, Volume 36, No. 3, March 1965, pages 1103 and 1104, it is known to form the raster by directly providing the magnetic strip with magnetic characteristics arranged in raster form. These magnetic characteristics may be in the form of a position-variable coercitive field force and the technological means for providing these magnetic characteristics are well known in the art. Where a position-variable coercitive field force is employed the shifting of the information requires merely an impulse field which is uniform over the entire magnetic strip.

A drawback of prior art devices is seen in the substantial costs of producing such devices. In spite of such costs the storage capacity of prior art devices is rather small. Another drawback is seen in that the windings for the phase shifted impulse currents cannot be place or located as precisely as desired. Besides, it is not possible to space these windings as closely as desired. As a result the storage capacity is substantially impaired. An the other hand, even photo etching methods do not permit, in spite of being very expensive, the production of any direct and correspondingly fine rastering on the magnetic strips.

OBJECTS

In view of the foregoing it is the main object of the invention to overcome the outlined drawbacks.

Another object is to reduce the manufacturing costs of such magnetic shift memories.

A still further object is to substantially increase the storage capacity of these devices.

Yet another important object is to provide a magnetic shift memory of simple construction which assures a sufficiently fine rastering even for magnetic strips of any desired length.

Another object is to provide a magnetic shift memory in the form of an endless band or strip.

It is also an object of the invention to assure an information shift without erasing or destroying the information by the shifting.

SUMMARY OF THE INVENTION

The above objects have been achieved by incorporating a magnetic shift memory in a magnetic strip and providing above and/or below of the strip a permanent magnetic layer of hard magnetic material serving as a raster by having sufficiently fine, periodic, magnetic outline or recording thereon, said outline extending longitudinally and/or laterally and/or transversally of the strip. Methods for producing such outline are known as such, for example, by means of dynamic magnetic storage techniques. Said outline, through its extraneous magnetic stray field, periodically premagnetizes the magnetic strip when displaced relative thereto, in such a manner that a raster-like periodic variation of the critical switching field strength or force is produced.

Figure 2:
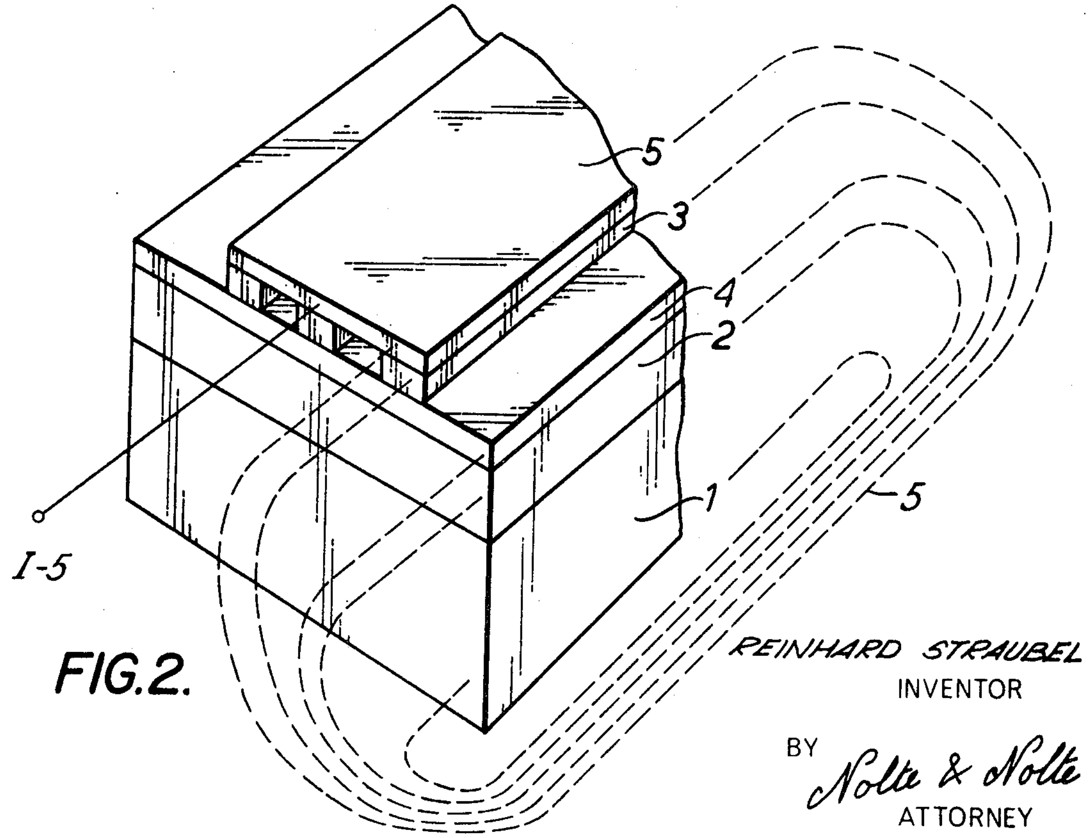

In the drawing:

FIG. 1 is a schematic, perspective view, partly broken away, of a magnetic shift memory according to the invention; and FIG. 2 is a schematic, perspective view of another magnetic shift memory according to the invention.

The periodic, magnetic outline or recording M on or in the permanent magnetic layer 2 may have a periodicity which is not constant along the length of the strip 3 whereby a higher replay resolution is achieved. The magnetic strip 3 is suitably, electrically insulated from the permanent magnetic layer by an intermediate, nonmagnetic layer 4 which preferably is made of elastic material. By respectively selecting the thickness of the non-magnetic layer, it is possible to produce along the entire length or in certain areas of the information in 3, memory rasters M of differing effective fineness.

The permanent magnetic layer 2 comprises one or several metallic layers or laminae 2A, 2B. In another embodiment not shown, permanent magnetic, single domain particles are embedded in a non-magnetic binder. It is also possible to combine such layers and embedded particles. Further, the magnetic strips and the permanent magnetic means such as the layers may be applied to a film base or carrier 1 made of an elastic foil.

It is an advantage that the magnetic shift memory according to the invention may be easily produced as a continuous, circulating memory in the form of an endless band or strip 3. It is also advantageous to provide an electrically well conducting layer 5 for the impulse shaped current I-5, for example on the top of the magnetic strips (FIG. 2) because such electrical conductor reduces the electronic means required for the information shifting.

It is relatively simple to produce a magnetic shift memory constructed as taught by the invention and the memory may even be produced as an endless band. The storage capacity of the memory according to the invention is superior to the storage capacity of comparable known systems.

SHORT FIGURE DESCRIPTION

Thus it will be understood that the magnetic strips 3 serve for the purpose of effecting said information shift. The impulse shaped current I-3 required for the information shifting may flow directly through the permanent magnetic layer 2 or through the magnetic strip 3. The strip is made of soft magnetic material as compared to layer 2 which is made of hard magnetic material.

In FIG. 2 the shift memory comprises in addition to the elements shown in FIG. 1, a layer 5 directly in contact with the strips 3 and having a good electrical conductivity for the impulse current.

Although specific examples have been described, it is intended to cover all modifications and equivalents within the scope of the appended claims.

What I claim is:

1. In a shift register of the type comprising a strip of magnetic storage material within which magnetic domains may be stored, and wherein means are provided for producing a periodic pulsatory field positioned to effect the shifting of domains stored in said storage material; the improvement comprising a permanent magnetic layer of a hard magnetic material, said permanent magnetic layer having recorded therein a periodic magnetic pattern forming a raster, and having a stray magnetic field, said strip being fixedly positioned in said stray field whereby the stray magnetic field produces a periodic variation in the article switching field strength of said strip, said means producing a periodic pulsatory field comprising non-position dependent means for producing a field which influences the strip substantially uniformly throughout its length.

2. The shift register of claim 1, wherein the periodic magnetic pattern in said permanent magnetic layer has a variable periodicity along said strip means.

3. The shift register of claim 1 wherein said permanent magnetic layer is comprised of a plurality of laminae.

4. The shift register of claim 1 further comprising a substrate of an elastic material for supporting said strip and said layer.

5. The shift register of claim 1 wherein said strip and said layer are in the form of endless bands.

6. The shift register of claim 1 wherein said means for providing a pulsatory field comprises a source of a pulsatory current, and a conductive strip connected to said source and positioned whereby the field produced by said current effects the shifting of domains in said strip.

7. The shift register of claim 6 wherein said electrically conducting layer is positioned in contact with said strip.

* * * * *